Patented Feb. 27, 1940

2,192,119

UNITED STATES PATENT OFFICE 2,192,119

DENATURANT

John C. Woodhouse, Cragmere, Del., assignor to E. I. du Pont de Nemours & Company, Wilmington, Del., a corporation of Delaware No Drawing. Application December 18, 1937, Serial No. 180,563

4 Claims. (Cl. 202—77)

This invention relates to denaturants and more particularly to denatured alcohols and the method of denaturing them.

Many proposals have been made in the past for the use of various materials which, when mixed with a substance such as an alcohol, or ester, completely change its taste or odor or both so that it cannot be diverted from its intended use or can readily be identified or both. For example, this procedure has been applied to methanol to avoid its being taken internally, as well as to ethanol and other alcohols which might otherwise be diverted from their intended commercial use to that of a beverage. Similarly, substances such as ethyl acetate, and other esters, which might fairly easily be otherwise converted to alcohols and thus diverted from their intended use, have likewise been denatured. Upon chemical treatment of such esters, the denaturant has been intended to carry over to the alcohol and cause it to be unpotable.

Materials which have been proposed as denaturants before have had one or more characteristics which adapt them for denaturing purposes. There are, however, several specific features which it is desirable to have in a denaturant and all of which have not been possessed to a sufficient degree by the denaturants previously suggested. Thus, for example, it is desirable that a denaturant have an obnoxious taste and a distinctive odor. Substances have been proposed previously which possess disagreeable tastes but the odor carried by the denaturant has often been of such a character as to make the final denatured alcohol commercially undesirable.

Another characteristic which a denaturant must possess is that of difficulty of removal from the denatured medium. As rapidly as denaturants have been proposed, methods have been discovered for their removal from the denatured medium. The methods utilized for removal of denaturants have been usually chemical treatment of the denatured medium combined with or followed by various distillation steps and further chemical treatment until, finally, relatively pure alcohol has been obtained.

It is an object of the present invention to overcome the disadvantages of the prior art and to provide a new and improved denaturant and denatured materials.

It is a further object of the present invention to provide a denatured ethyl alcohol which possesses a distinctive but unobjectionable odor, and a taste which renders the ethyl alcohol unpotable.

Other objects and advantages of the present invention will be apparent by reference to the following specification in which the preferred embodiments and details are set forth.

According to the present invention a denatured material from which it is extremely difficult if not impossible to remove the denaturant is prepared by mixing with a liquid material such as gasoline, an ester such as ethyl acetate, an alcohol, including such alcohols as methyl, ethyl, and propyl, and the like, relatively small quantities of an unsaturated aliphatic alcohol containing only the elements carbon, hydrogen, and oxygen, boiling in the range of from 100 to 200° C. and having the general formula $R_1R_2CHOH$ in which $R_1$ and $R_2$ may be hydrogen or acyclic or isocyclic hydrocarbon radicles.

The denaturants of this invention are generally applicable for treatment of any normally liquid material which it is desired to denature although, preferably, the material to be denatured should have a boiling point in the range of 30° C. to 250° C. From a material having a boiling point in this range it will be found extremely difficult, if not impossible, to remove my denaturant.

My denaturants are also adapted to and effective in denaturing and distinguishing motor fuels from one another in cases, for example, where it is desired to identify and keep separate individual supplies or stocks of gasoline. Specifically, my denaturants are highly effective as a means of marking or giving a distinctive odor to tax-free gasoline.

A wide range of alcohols may also be successfully denatured or distinguished from one another according to this invention, such, for example, as methyl alcohol, ethyl alcohol, butyl alcohol, isobutyl alcohol, isopropyl alcohol, and others. Similarly, a large number of esters may be successfully denatured or distinguished from one another, substantially the only requisites being that the ester should have a boiling point in the range above indicated and, further, the ester should be one which might be fairly easily transformed into an alcohol. Thus, for example, in addition to denaturing ethyl esters such as ethyl acetate mentioned before, the denaturants of this invention may be utilized with other esters such as methyl, propyl, isopropyl, butyl and isobutyl acetates and the like or similarly to like formates, propionates, butyrates, isobutyrates and like esters.

These unsaturated aliphatic alcohols possess a pungent odor and are unpotable because of odor and taste. Both the odor and the taste persist in spite of drastic treatment utilized for their removal.

The following examples illustrate proportions of various materials which may be utilized as denaturants. It will be noted that small quantities only of the denaturant are necessary for denaturing purposes and that the material remaining after treatment for denaturant removal possesses an undesirable taste and a distinctive odor.

*Example 1*

200 cc. of denatured alcohol, prepared by adding 5 volumes of ethyl ethynyl carbinol.

($CH_3.CH_2.CH(OH).C\!:\!CH$, B.P. 122–125° C.)

to 100 volumes of pure 95% ethanol, was diluted with 600 cc. of saturated salt solution and 200 cc. of water. The resulting solution was clear. It was shaken with 50 cc. of mineral oil for 3 minutes and allowed to stand over night. The water layer was shaken for 3 minutes with a 40 cc. portion of mineral oil and allowed to stand 1 hour. The water layer from the second extraction was shaken with 10 g. of activated carbon for 30 minutes and filtered. The filtrate was then given a similar treatment with a second 10 g. portion of activated carbon. The filtrate from the second carbon treatment was then distilled at a reflux ratio of 10:1 and a draw-off rate of 1 cc. per minute using a fractionating column of approximately 15 theoretical plates. 176 cc. of distillate was collected. The distillate had the odor and taste of the denaturant and was unpotable.

*Example 2*

A denatured alcohol, prepared by adding 5 volumes of isopropyl ethynyl carbinol ($CH_3.CH(CH_3).CH(OH).C\!:\!CH$, B.P. 133–133.5° C.)

to 100 volumes of pure 95% ethanol, was treated by the procedure of Example 1. The distillate had the odor and taste of the denaturant and was unpotable.

*Example 3*

An unpotable alcohol was prepared by adding 5 volumes of methallyl alcohol ($CH_2\!:\!C(CH_3).CH_2.OH$, B.P. 114.5° C.)

to 100 volumes of pure 95% ethyl alcohol.

*Example 4*

A denatured ethyl propionate was prepared by adding 2 volumes of methallyl alcohol to 100 volumes of pure ethyl propionate.

*Example 5*

A denatured ethyl acetate was prepared by adding 2 volumes of isopropyl ethynyl carbinol to 100 volumes of 85% ethyl acetate.

*Example 6*

A denatured gasoline was prepared by adding 3 volumes of methallyl alcohol to 100 volumes of gasoline.

Although not indicated in the examples above given, the materials of the present invention may be utilized alone or may be admixed with other denaturing materials, such, for example, as sulfur-containing materials, wood oil products, and other known denaturing materials. It may be desirable, from time to time, to add other denaturing materials which possess stronger and more disagreeable odors than the denaturants of the present invention as a method of distinguishing the denatured alcohol utilized from other denatured alcohols or for other reasons. The material of the present invention is miscible, however, with anything, generally speaking, with which ethyl alcohol is miscible and may, therefore, be utilized in conjunction with other denaturing materials generally, such as illustrated by the following additional examples which show representative, preferred mixtures.

*Example 7*

An unpotable alcohol was prepared by adding 15 to 100 parts by volume of 95% ethyl alcohol, two parts methyl isobutyl ketone, three parts of methallyl alcohol, one part of the sulfur-containing residues obtained in the refining of petroleum and known under the name of "Agdite", and one part of gasoline.

*Example 8*

An unpotable alcohol was prepared by adding to 100 parts by volume of 95% ethyl alcohol two parts of isopropyl ethynyl carbinol, four parts of a mixture of primary and secondary aliphatic higher iso alcohols and higher branched chain ketones (known under the name of "Denol"), and one part of the liquid denaturant described and claimed in my copending application S. N. 143,295, comprising a mixture of higher branched chain ketones and saturated and unsaturated hydrocarbons.

*Example 9*

An unpotable alcohol of undesirable taste and distinctive odor may be prepared by adding to 100 parts by volume of 95% ethyl alcohol, three parts of isopropyl ethynyl carbinol, four parts of the mixture of pyroligneous bodies, free from methanol, produced by the destructive distillation of wood, and one part of gasoline.

Although the several examples illustrate the use of a variety of unsaturated alcohols according to this invention, other alcohols may equally as well be substituted therefor, such for example, as: 1-butynol-3; 1-butenol-4; 2-pentenol-4; 2-methyl-2-pentenol-4; 1-hexenol-5; 1,6-heptadienol-4; 2-methyl-6-heptenol-4, and the like.

The proportions utilized according to the present invention may vary from a very small quantity, such as one-tenth of one per cent, up to ten per cent by volume or more of the alcohol, or material which is to be denatured, the amount of denaturant depending entirely upon the degree of odor and taste desired. Small quantities are, however, generally sufficient, i. e., in the range of 0.1 to 5% by volume. Furthermore, although but a single denaturant has been illustrated as used at one time, it will be understood that mixtures of my denaturants may equally as well be utilized.

A great advantage of the present denaturant resides in the fact that it does not render the denatured material commercially and scientifically undesirable inasmuch as the character of the denatured material is not changed by the incorporation of my denaturant.

Various changes may be made in the present invention without departing therefrom or sacrificing any of the advantages thereof.

I claim:

1. A denatured ethyl alcohol consisting of ethyl alcohol and from 0.1% to 5% by volume of a material selected from the group consisting of: 1-butynol-3; 1-butenol-4; methallyl alcohol; 2-pentenol-4; ethyl ethynyl carbinol; 2-methyl-2-pentenol-4; isopropyl ethynyl carbinol; 1-hexenol-5; 1,6-heptadienol-4; and, 2-methyl-6-heptenol-4.

2. A denatured ethyl alcohol consisting of ethyl alcohol and from 0.1% to 5% by volume of ethyl ethynyl carbinol.

3. A denatured ethyl alcohol consisting of ethyl alcohol and from 0.1% to 5% by volume of isopropyl ethynyl carbinol.

4. A denatured ethyl alcohol consisting of ethyl alcohol and from 0.1% to 5% by volume of methyllyl alcohol.

JOHN C. WOODHOUSE.